UNITED STATES PATENT OFFICE.

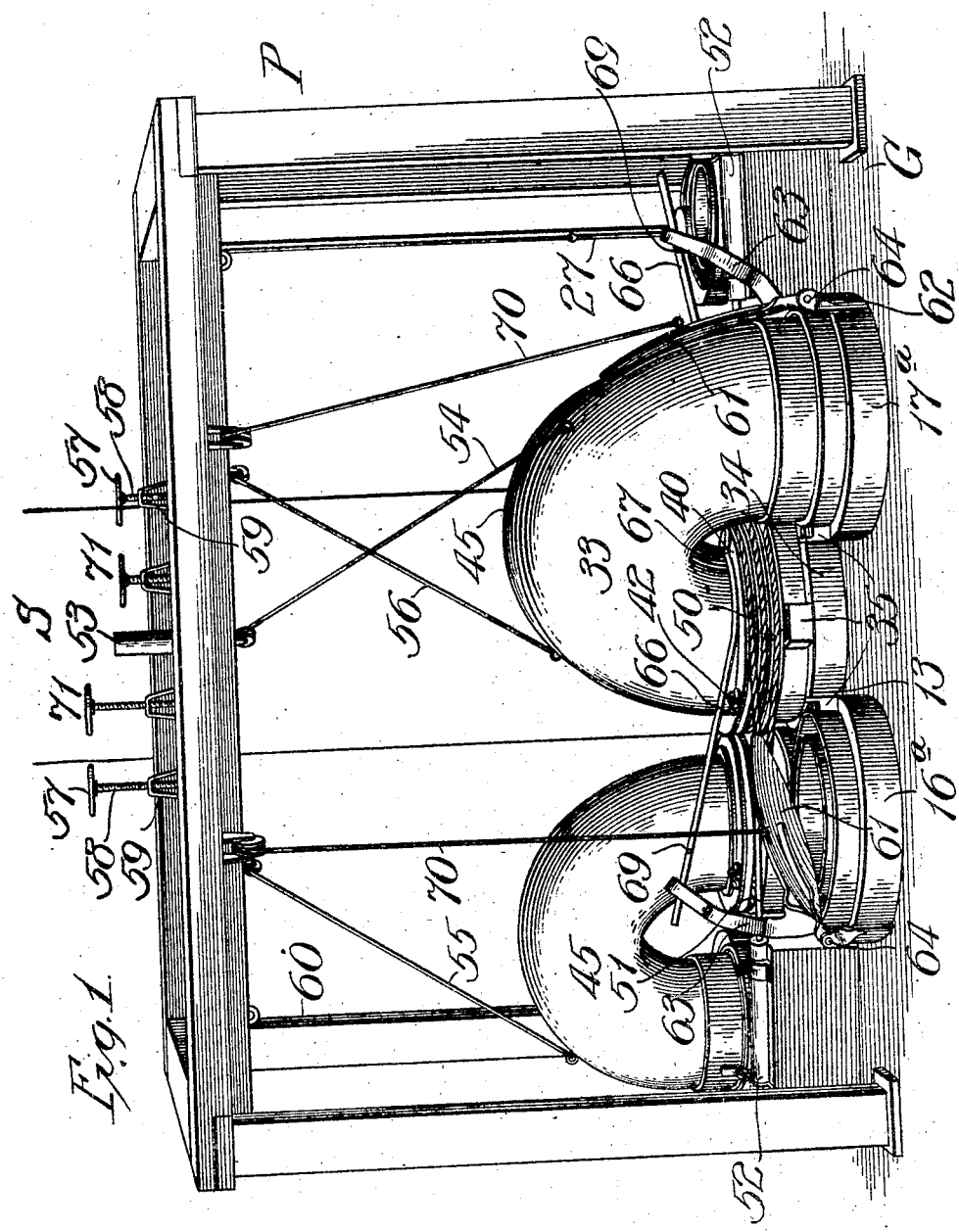

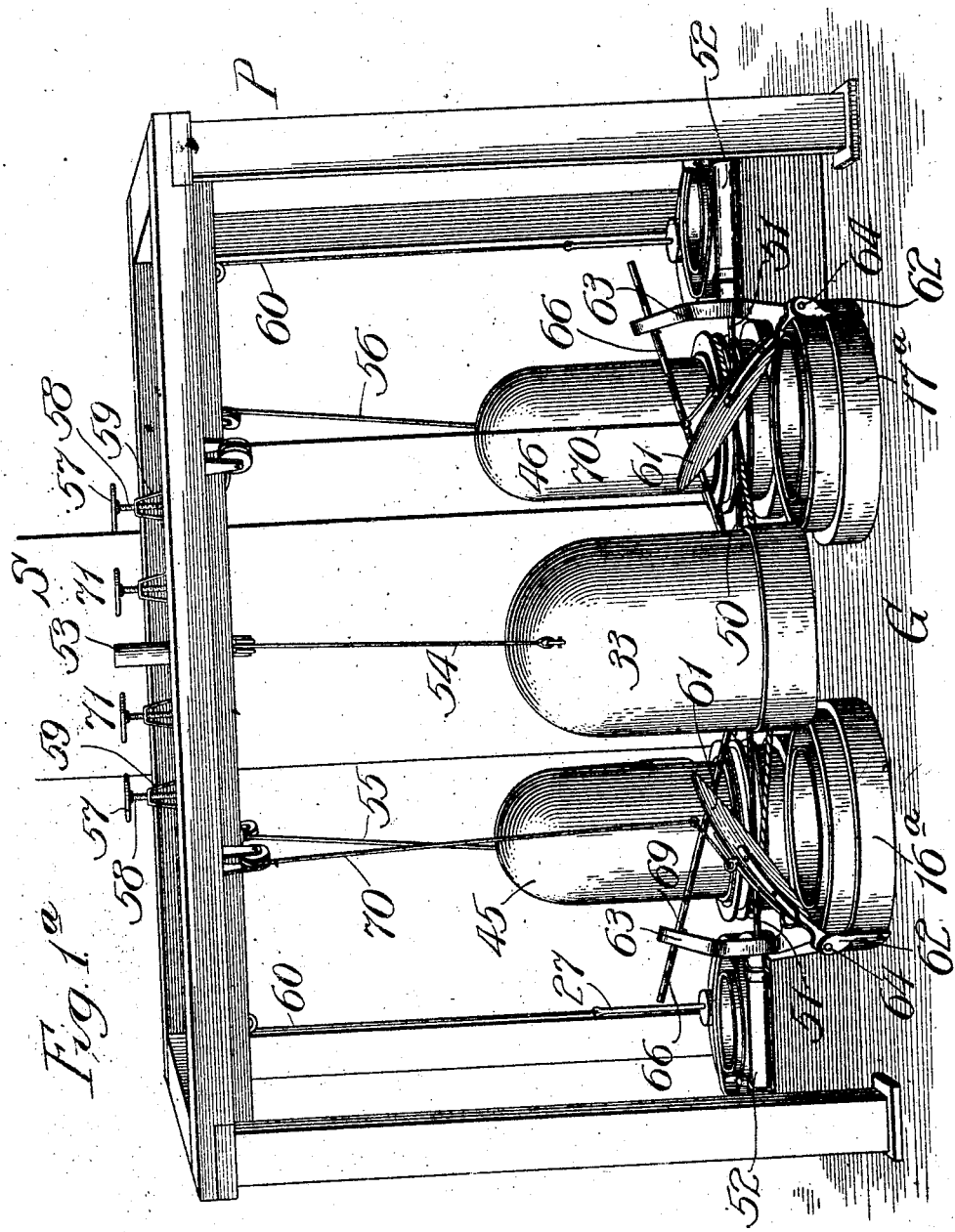

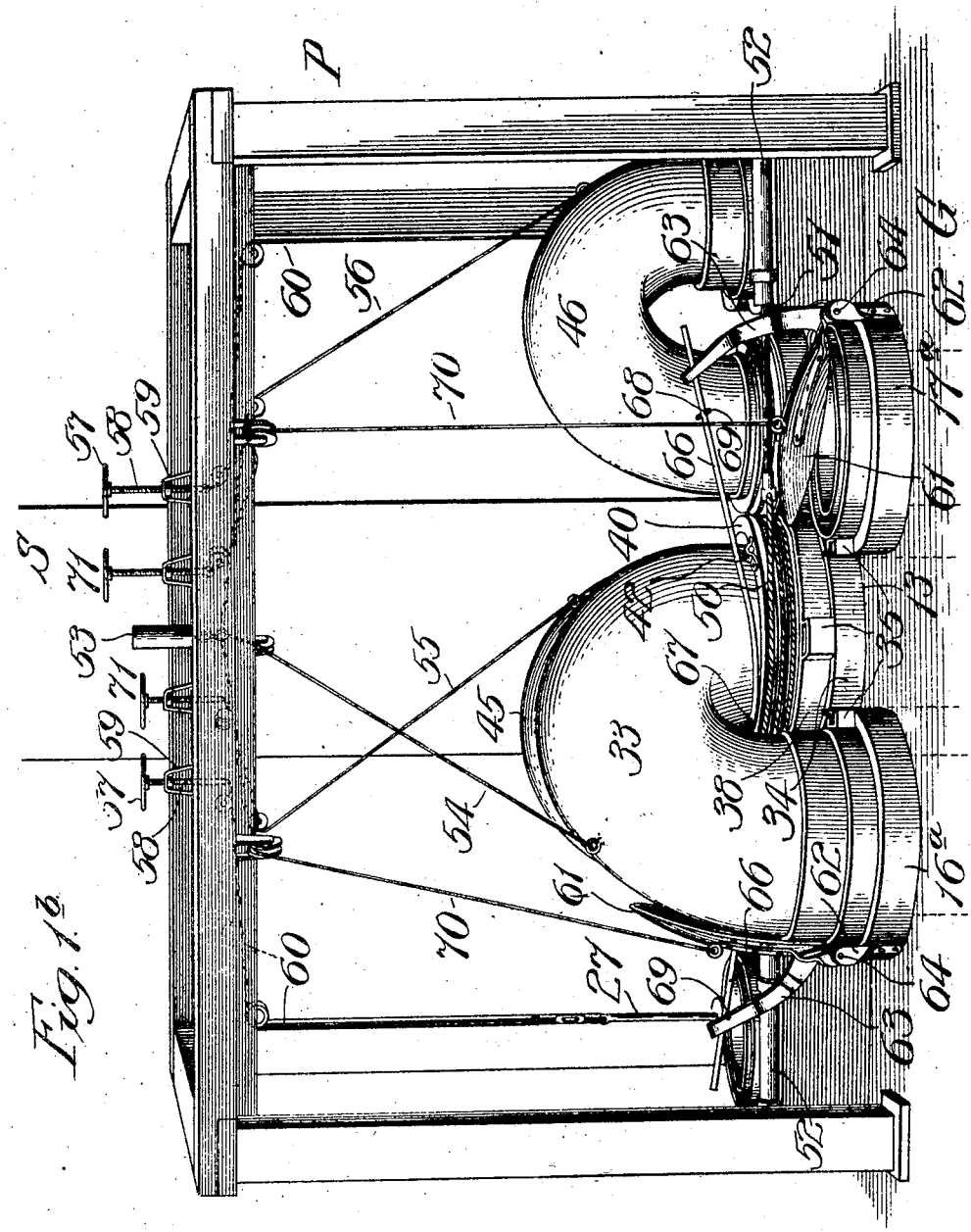

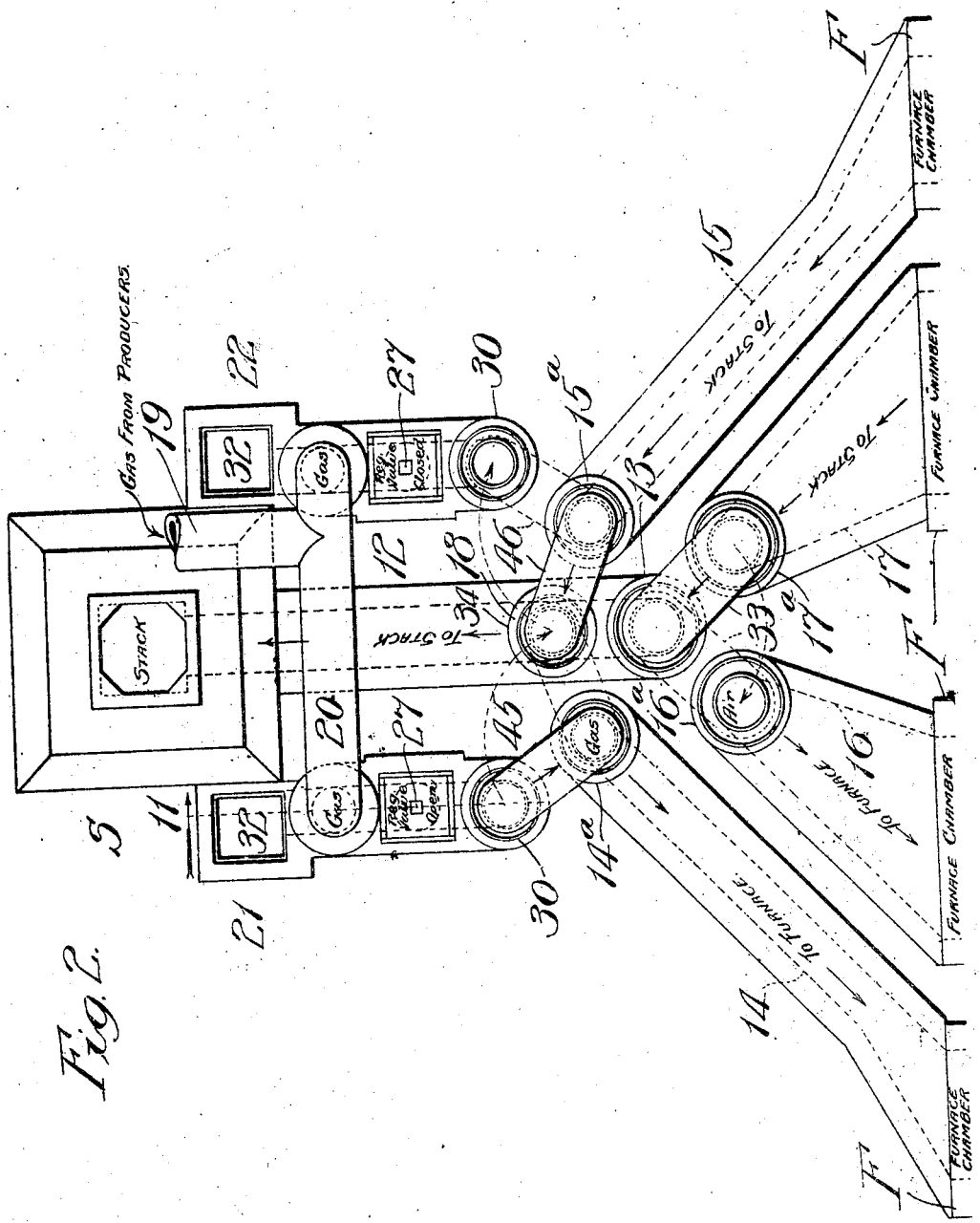

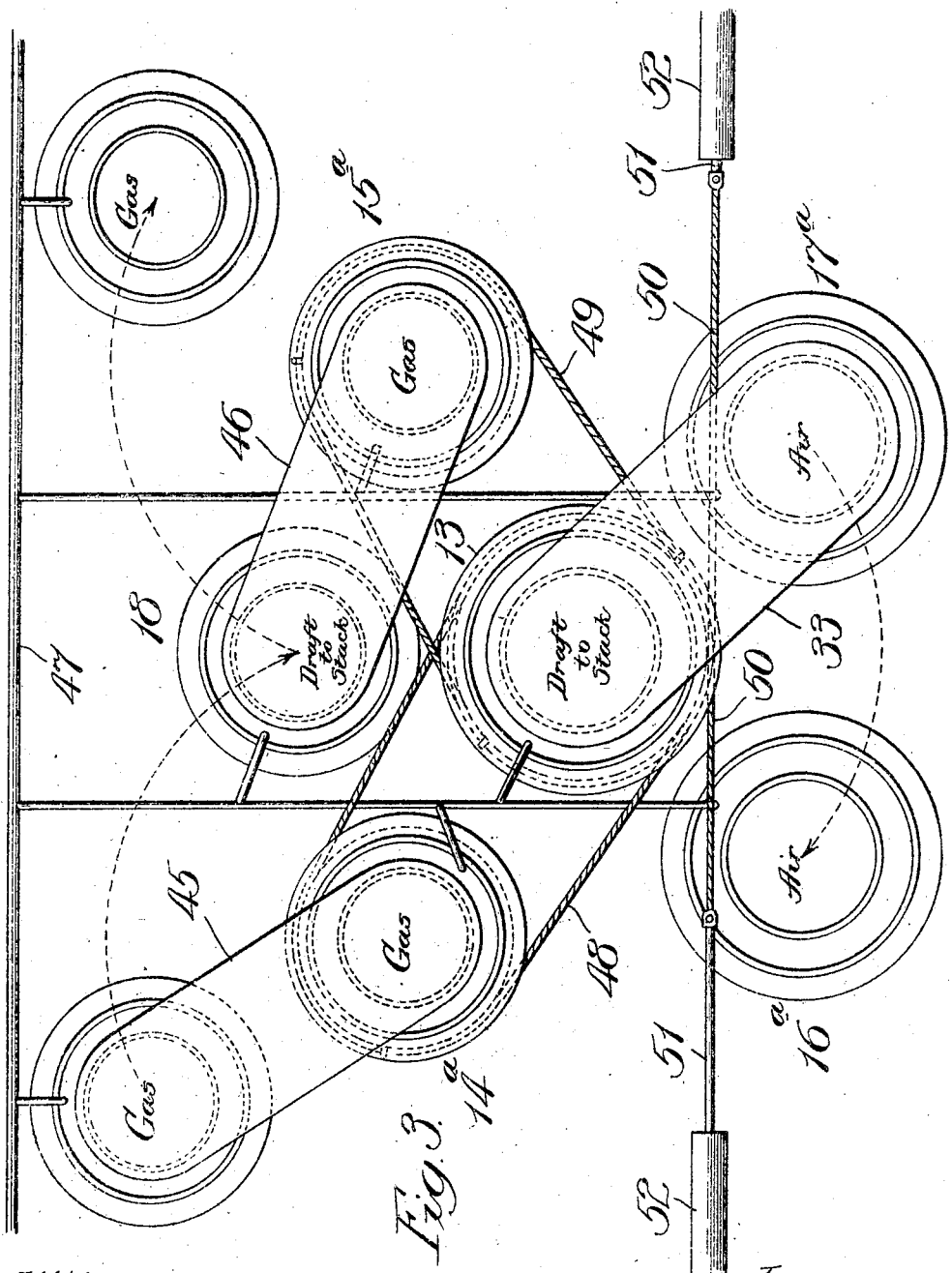

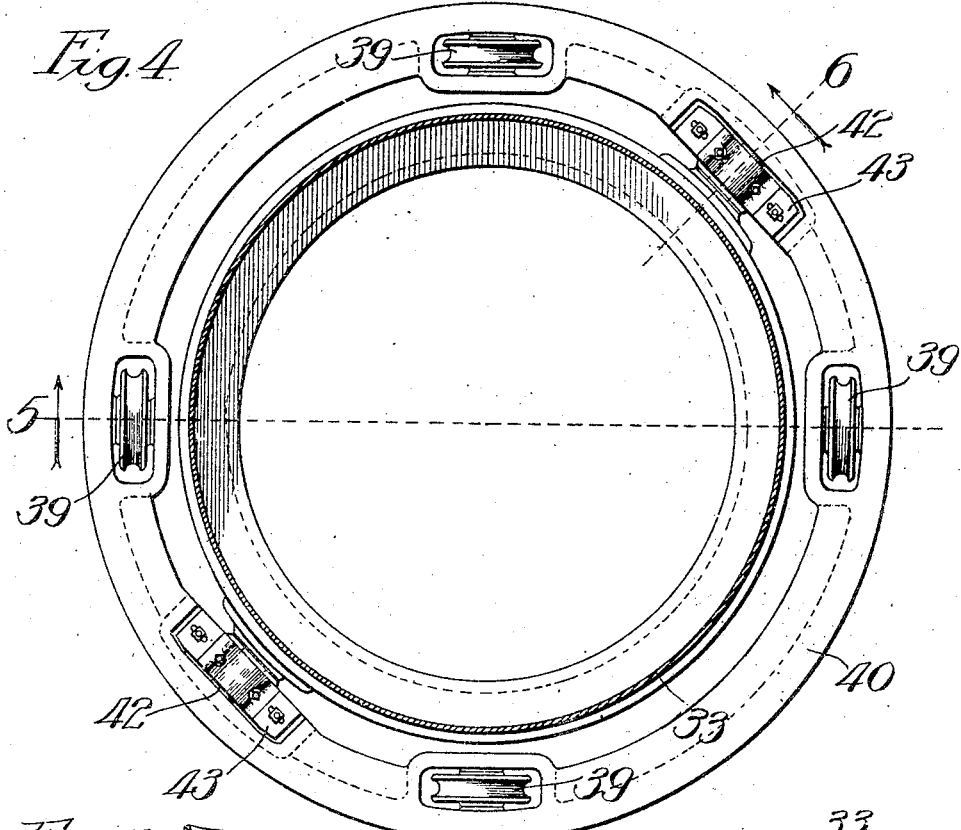
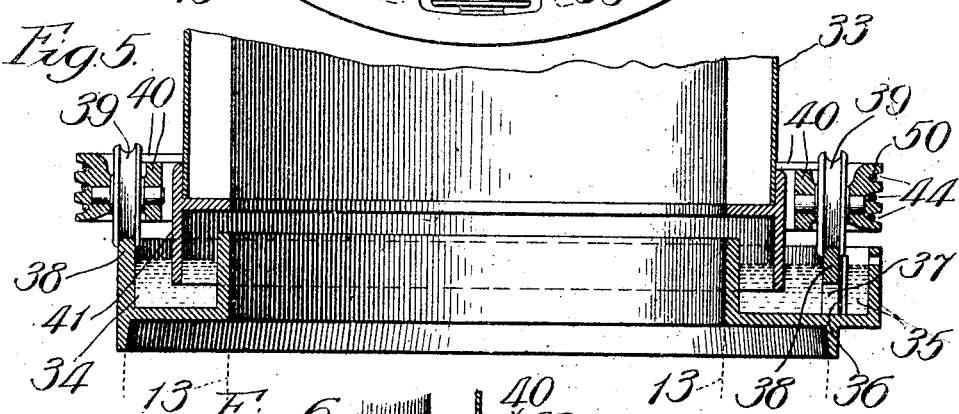
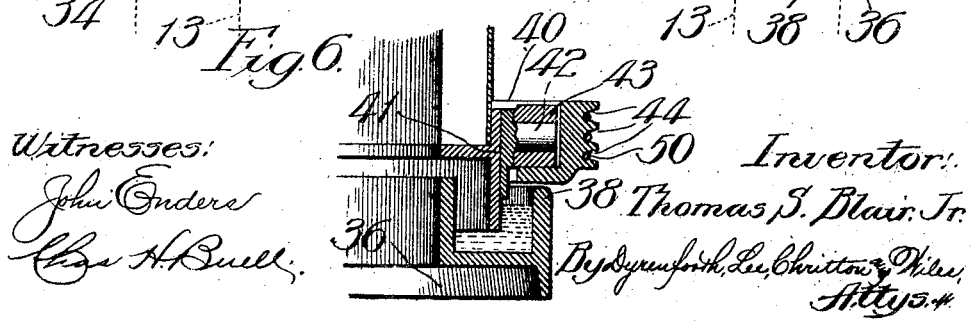

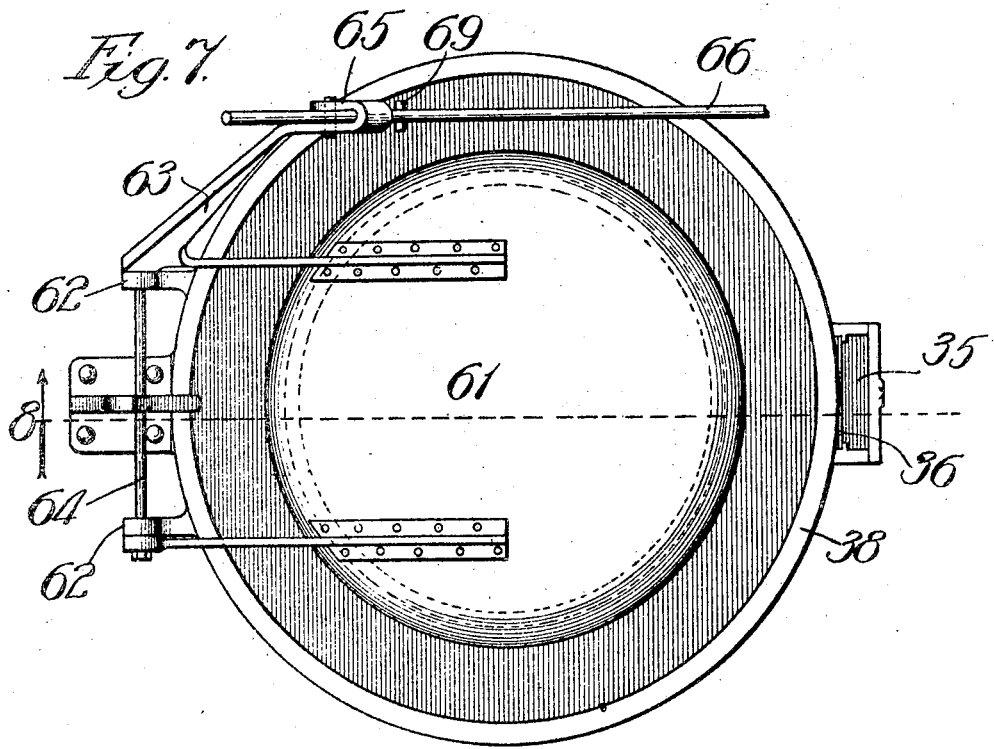
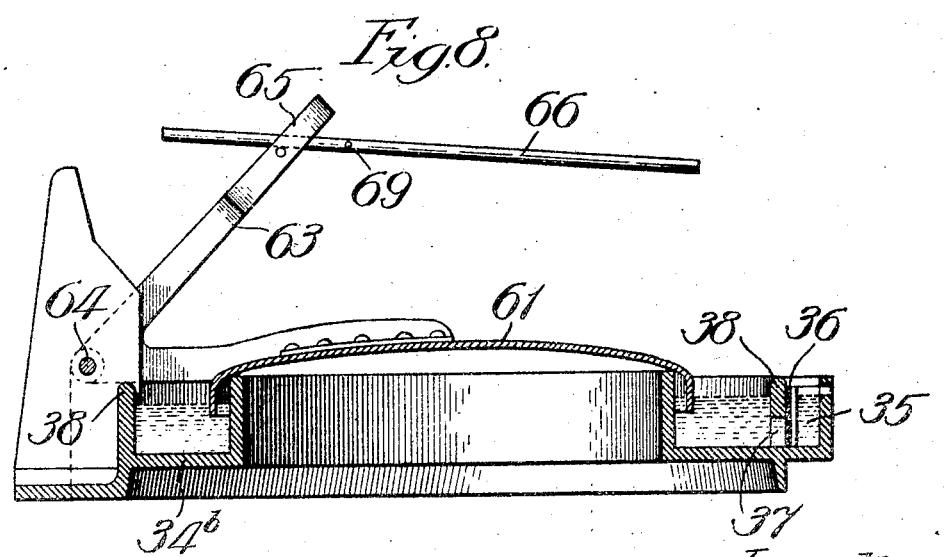

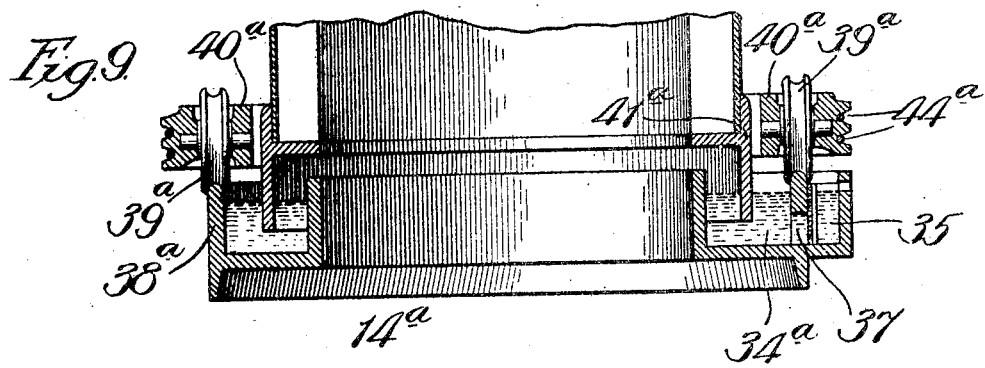
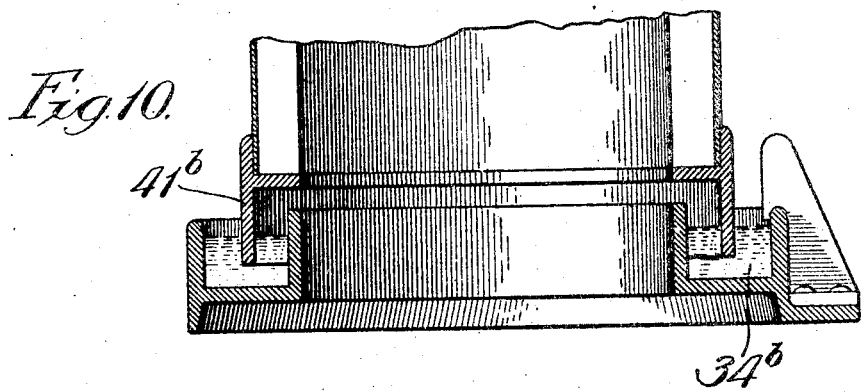
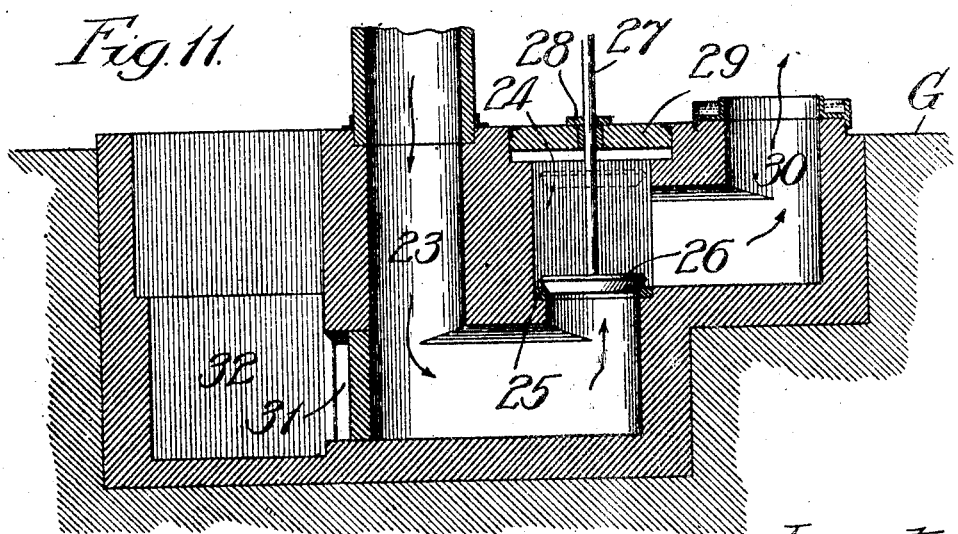

THOMAS S. BLAIR, JR., OF ELMHURST, ILLINOIS, ASSIGNOR, BY MESNE ASSIGNMENTS, TO BLAIR ENGINEERING COMPANY, OF CHICAGO, ILLINOIS, A CORPORATION OF NEW YORK.

REVERSING APPARATUS FOR REGENERATIVE FURNACES.

No. 929,277.  Specification of Letters Patent.  Patented July 27, 1909.

Application filed March 16, 1909. Serial No. 483,835.

*To all whom it may concern:*

Be it known that I, THOMAS S. BLAIR, Jr., a citizen of the United States, residing at Elmhurst, in the county of Dupage and State of Illinois, have invented a new and useful Improvement in Reversing Apparatus for Regenerative Furnaces, of which the following is a specification.

My invention relates to an improvement in the equipment which forms a necessary feature of the regenerative type of furnace for reversing the course through it of the burning gaseous fuel. In all such equipments hitherto provided, a so-called "valve" for directing the gases to and from the furnace under the force of the stack-draft is provided as a self-contained structure with internal longitudinal partition-walls, usually of fire-brick, forming the flues and affording the only separating medium between them. This structure is surmounted by a metal platform having openings through it for terminals of the flues and on which is supported mechanism for switching the course through the furnace of the gas and air. It is to the construction thus generally outlined that much of the trouble and expense involved in operating a furnace of the type referred to is attributable, since both the hot gases in their course to the furnace and the hot products of combustion in their course to the stack from the furnace pass through the same flue-containing structure or valve, so that the mere walls separating the flue-terminals therein from each other, being subjected to the intense heat of the gases, and to differences in the temperature of those coursing along opposite sides of the same wall, tend, especially under the very forcible suction-action of the stack-draft, to crack and sag and thus cause leakage through them from the gas-flue to the draft-flue. When such leakage occurs the gas necessarily seeks the more direct outlet, thereby afforded, to the stack, rather than the more roundabout course by way of the furnace and its regenerative chambers and flues to the opposite side of the partition, with the inevitable result of rapidly impairing the structure to an extent which incurs not only a great waste of fuel, by its deflection to the stack, but such inefficient operation of the furnace, because of both an inadequate supply thereto, of gas and diminished draft, as to render repairs imperatively necessary. Moreover, the platform referred to and mechanism upon it, being wholly or partly of metal and under constant subjection to the intense temperature-conditions, and variations therein, of the gas, suffer severely from deterioration under such exposure, besides inducing leakage underneath the platform, by warping thereof, from the gas-flue into the draft-flue. The seriousness of the frequently-occurring requirement for repairs, made necessary by the faulty construction thus explained, may be appreciated in considering the fact that to enable them to be made the gas-supply must be entirely cut off and the furnace, therefore, shut down, and that, inasmuch as the valve structure is at a high temperature and the brick flue-terminals are underground and consequently difficult of access, the work of repairing is extremely arduous and very slow, besides being excessively expensive. Furthermore, while the gas is shut off the furnace is out of commission incurring consequent loss in production, and the loss of its heat necessitates an extravagant expenditure for fuel to restore it to operation. While the tendency to leakage from gas-flue to draft-flue, which is greatest at the reversing-point because of the enormously-excessive draft there over that around through the furnace, the difficulty of making repairs, with consequent loss in production, and the waste of fuel, all hereinbefore referred to, are faults inherent in every known construction of furnace-reversing equipment, they are especially marked where the parts of the reversing mechanism are housed and operated within a gas-box, since the latter augments the difficulty of making repairs in the housed mechanism as also that of detecting any leak therein in its incipiency, so that such leaks are rarely discovered until they have become so bad as to seriously impair the operation of the furnace and work great damage to the mechanism, rendering necessary immediate and extensive repairs. All the faults thus explained are overcome and other advantages are obtained by my improvement hereinafter described and illustrated in the accompanying drawings.

A primary purpose of the present invention is to provide a valveless reversing apparatus for a reverberatory regenerative furnace, meaning thereby one that entirely dispenses with the so-called valve in prior apparatus for the same purpose, one known form of which is a rotatable plate carrying the adjustable connecting elbows or ducts through the medium of which the reversing action is accomplished. These valves are objectionable in being cumbersome and as essentially involving a structure of the apparatus whereby leakage is caused between the ends of the upright flue-terminals and those of the swinging ducts; and by omitting any valve as a part of my construction of a reversing apparatus I avoid the serious objection referred to and am enabled to utilize advantage a regulating valve in the gas-supply flue, an independent and more satisfactory means for controlling the supply of gas and entirely cutting it off during the period of each reversal of the furnace.

The construction of the uptake (and downtake) flue-terminals whereby they are entirely independent of each other, and without any form of inter-connection from one to the other except that afforded by the ducts, constitutes the more important feature of my improvement which is intended to be characterized in the appended claims wherein the flue-terminals are described, as being disconnected at their ends.

Referring to the drawings—Figure 1 shows my improved reversing apparatus by a perspective view looking from the adjacent furnace toward the stack and illustrating the parts in one operating position. Fig. 1ª is a similar view of the same showing the switching ducts intermediate their two operative positions and undergoing transfer to the position opposite that illustrated in Fig. 1, this last-named position of the same being presented, by a similar view, in Fig. 1ᵇ. Fig. 2 is a diagrammatic plan view of the apparatus showing its operative relation to the furnace-flues and stack between which it is interposed. Fig. 3 is another diagram showing the connections between the pivotal ends of the switching-ducts for turning them all simultaneously by turning one. Fig. 4 is an enlarged plan view of the annular seat provided on the terminal of the air-flue, which leads to the stack, for the pivotal switching-duct which connects the air-flue terminals with the stack. Fig. 5 is a section on line 5, Fig. 4, and Fig. 6 is a section on line 6, Fig. 4. Fig. 7 is an enlarged plan view of one of the two similar air-flue terminals equipped with a cap-valve for controlling the air-supply, and Fig. 8 is a section on line 8, Fig. 7. Fig. 9 is a section like that presented in Fig. 4 but through one of the two similar annular seats for the pivotal switching-ducts which control the flow of the gaseous fuel through the furnace and direct the discharge of the products of combustion to the stack. Fig. 10 shows a cross-section through one of the similar annular water-sealed flue-terminals for receiving the free ends of the switching-ducts; and Fig. 11 is an enlarged section on line 11, Fig. 2, showing the construction of one of the two similar valved passages for controlling the supply of the gaseous fuel from the source thereof (as gas-producer or place of storage) to the furnace through the reversing apparatus.

The desirable location for the reversing apparatus is that represented, being at a central point to one side of the furnace, indicated at F, (Fig. 2), between the latter and the stack S on the ground-level, indicated at G, and within the confines of an open framework P, which rises from that level to a height adapting it to form a section of the usual elevated working platform of the furnace. The flue 12 (Fig. 2), which leads underground into the base of the stack, has its outer end forming a vertical terminal 13 at the center of the base of the structure P. The flues indicated at 14 and 15 for directing, alternately, the fuel-gas through the furnace and the products of combustion from the discharge-end of the furnace to the stack, and the flues indicated at 16 and 17 for directing, alternately, combustion-promoting air through the furnace to the stack, are each built as a separate independent structure of suitable material (preferably firebrick), and they are spaced apart to enable them to be thoroughly insulated from each other either by the air-spaces between them or, when they are, more properly, built underground, by a filling in the spaces between them of earth, concrete or the like heat-insulating material. The showing in Fig. 2 of the way these four flues run is intended to be merely indicative, since their relative arrangement may be varied for different furnaces in equipping them with my improvement. However, they all lead to a common point by ending in the reversing apparatus in vertical terminals at 14ª, 15ª, 16ª and 17ª, respectively, shown as clustering about the central stack-flue terminal 13. A vertical branch 18 of the flue 12 leads into the latter and forms a second terminal thereof in advance of the terminal 13 for the purpose hereinafter explained; but this branch may, obviously, form the terminal of a separate flue leading to the stack.

The gas used as fuel goes from the source of supply to the furnace through a pipe 19 discharging into another pipe 20 which extends transversely thereto (Fig. 2), and opens at its ends into similar valve-chambers 21 and 22, each like that shown, as a preferred construction, in Fig. 11; these chambers being located adjacent to the stack for connection, respectively, with the flue-terminals 14ª and 15ª. Each valve-chamber is formed with an inlet-passage 23 leading to a vertical well 24 in the open base of which is provided a seat 25 for a valve 26, shown of ordinary "mushroom" variety with its stem 27 working through a stuffing-box 28 in the well-cover 29. This valve controls the flow of the gas from the well-section to the outlet-passage 30. At the base of the inlet-passage 23 is a gate-closed opening 31 leading to a vertical pit 32 open at its top and through which to gain access to the valve-chamber for cleaning it, repairing the valve, and the like.

On the flue-terminal 13 is rotatably mounted one end of a switching-duct 33 shown in its preferred form of an arc-shaped tube and which is best formed of steel plate lined with fire-brick. The means I prefer to employ for rotatably mounting this duct are shown in Figs. 4, 5 and 6, to coöperate with an annular water-seal trough 34 capping the flue-terminal 13 and provided with an overflow-chamber 35, at a suitable point on its circumference and partitioned by a screen 36 from the trough at its discharge-opening 37 therein. The outer wall of the trough forms a track 38 for wheels 39, of which four are shown to be employed, journaled at equal intervals apart in a ring 40 encircling an annular reinforcing thimble 41 surrounding and seating the adjacent end of the tube 13 and which dips into the trough 34; and the ring 40 yieldingly supports the tube by trunnions 42 projecting at diametrically-opposite points of the thimble and journaled in bearings 43 on the ring. The outer circumference of the ring has formed in it three cable-grooves 44, for the purpose hereinafter explained.

A switching-duct 45, exactly like the duct 33 but of smaller dimensions, is rotatably and tiltingly mounted at one end on the flue-terminal 14ª in the same way as that described of mounting the duct 33; and the parts are denoted by the reference-characters 40ª for the ring, 39ª for the wheels, and 41ª for the thimble which dips into the annular trough marked 34ª and forming the track 38ª (Fig. 9); and the ring contains a cable-groove 44ª in its periphery.

A switching-duct 46, in all respects like the duct 45, is rotatably and tiltingly mounted on the flue-terminal 15ª in the same way as that described of the duct 45.

Each of the flue-terminals 16ª and 17ª, as also those of the gas-valve outlet-passages 30 and that formed by the outer end of the branch-flue 18, is equipped with a water-seal like that shown in Figs. 8 and 10 and similar to that about the pivotal ends of the switching-ducts, involving an annular trough 34ᵇ into which dips a thimble 41ᵇ encircling the free end of the duct. Water may be supplied to the several troughs for sealing the joints between the parts meeting in them in any suitable manner to discharge through their overflows to any desired point. In Fig. 3 the sealing water is shown to be supplied from a header 47 through branches leading therefrom to the different troughs.

With the switching-ducts in the relative positions presented by full lines in the diagram (Fig. 2), which corresponds with the showing in Fig. 1, the duct 45 connects the gas-flue terminal 14ª with the terminal of the adjacent gas-valve device 21, the other, 22, being closed; the duct 46 connects the gas-flue terminal 15ª with the flue 12 at its branch 18, and the duct 33 connects the stack-flue terminal 13 with the air-flue 17 at its terminal 17ª. The course of the gas is then by way of the duct 45 and flue 14 through the furnace whence part of the products of combustion discharge through the flue 15, duct 15ª and flue 12 to the stack; and the air is sucked by the stack-draft through the terminal 16ª, flue 16 and furnace, whence the rest of the products of combustion discharges to the stack by way of the flue 17, duct 33 and flue 12. To reverse the course of the gases, the valve 21 is closed to shut off the gas-supply through it, and the switching ducts, after disengaging their swinging-ends from the respective water-seals, are turned on their pivotal ends, all as hereinafter described, to the positions represented by dotted lines, wherein the duct 45 registers with the branch 18, the duct 46 with the valve 22 at 30, and the duct 33 with the terminal 16ª, whereupon the valve 22 is opened to cause the gas-supply to course by way of the duct 46, terminal 15ª and flue 15 through the furnace, and the air courses through the furnace from the terminal 17ª by way of the flue 17; the products of combustion discharging from the furnace into the stack by way of the flues 14 and 16, ducts 45 and 33 and flue 12. Preparatory to swinging the switching-ducts from either position to the other, their free ends must be raised to clear the water-seal troughs; and it is desirable that the ducts shall be swung simultaneously by one operation. These functions may be performed by any suitable mechanism adapted to be operated by hand or, and preferably, by power. As suitable means for so swinging the ducts, I provide the cable-connections shown in Fig. 3, though chains or gears may be substituted for them. A cable 48 passes about one groove 44 in the ring 40 on the duct 33 and about the grooved ring 44ª on the journaled end of the duct 45, thus forming an endless flexible connection between these two ducts; and the duct 33 has a similar connection 49 with the pivotal end of the duct 46, whereby swinging the duct 33 to reverse the air-course through the furnace simultaneously swings the ducts 45 and 46 to their gas-reversing positions. For so swinging the duct 33 a cable 50 is shown wound about its grooved ring 40, with the cable-ends extended in relatively opposite directions and connected, each, with the adjacent stem 51 of a piston contained in a cylinder 52 and adapted to be actuated by hydraulic or other pressure. For raising the free ends of the three ducts simultaneously out of their seating-troughs on the respective flue-terminals preliminary to swinging them to their reversing positions, I have indicated on each of Figs. 1, 1ᵃ and 1ᵇ a power-cylinder 53 supported on the frame P and having the stem of its piston connected with the ducts 33, 45 and 46, respectively, by cables 54, 55 and 56 passing over suitably placed guide-pulleys on the frame; and this cylinder may likewise be operated by water-pressure, so that it would be an easy matter to connect it with the cylinders 52 for controlling the operation of all from a single point to cause the action by the cylinder 53 of simultaneously raising the ducts to be followed by that of a cylinder 52 of turning them to register properly in their reversing positions, where they drop to their respective water-sealed seats by slacking the said cables. The hand-wheels 57 on stems 58 working in bearings 59 on the frame P and having pulley-guided connections 60 with the gas-valve stems 27 form suitable means for adjusting the valves 26 relative to their seats.

The air-supply through the terminals 16ᵃ and 17ᵃ should be regulable to suit conditions in the furnace, requiring the admission of more or less air. For this purpose I provide each of these terminals with a cap-valve 61 (Figs. 8 and 9) hingedly supported on suitable bearings 62 extending from the outer wall of the respective trough 34ᵇ, with a crank-arm 63 extending from one end of the hinge-pintle 64 and terminating in a loop 65. A divided rod 66 pivotally connected at its inner ends, as at 67, with the duct 33 extends at its outer ends through the loops of the two arms 63, adjacent to each of which the rod is provided with a transverse hole 68 for a pin or stop 69. Each cap-valve is connected by a cable 70, passing over pulleys suitably located on the frame P, with a different adjusting device 71, like that hereinbefore described as comprising the parts 57, 58 and 59, to enable the cap-valves to be set and held at any position relative to the air-inlet flue-terminal on which it is provided, for rendering the latter more or less open to the ingress of air. In each of Figs. 1 and 1ᵇ the cap-valve covering the open air-inlet terminal is shown to be set to assume relative thereto an angle of about 20 degrees. When the switching-ducts have been raised by the device 53 preparatory to swinging them from either position to the other by operating the proper device 52, they will, on attaining such position, be dropped into place through the medium of the device 53. In swinging from one position to the other, as indicated in Fig. 1ᵃ, the duct 33 carries the rod 66 in the direction to permit the cap-valve on the terminal 17ᵃ to lower by gravity as far as its setting will permit, but the other cap-valve is not raised, to make way for seating the free end of the duct 33, until the adjacent pin 69 encounters the respective crank-arm 63 in passing through the loop 65, whereupon the raising of that cap-valve begins. As will thus be seen, therefore, by providing for lost motion in the movements of the rod 66 until a pin 69, in any position of adjustment thereon, encounters the crank-arm in its path, the setting of the cap-valve in use need not be disturbed until just previous to making the stack-connection therewith, while the other cap-valve will automatically assume its set position practically as soon as its air-supply controlling function is required to be brought into play.

As will be apparent from the foregoing description, the operation of my improved reversing mechanism may be likened to that of a switch in a railroad-track, each switching-duct being seated at one end to rotate about a central axis for swinging its opposite free end. It will also be noted that my improved mechanism is devoid of any valve in the sense of the valve-device required to be employed in all other furnace-reversing apparatus known to me, and which is usually in the form of a rotary circular plate carrying tubular flue-connecting elbows and serving to cut off the stack and gas flue-terminals by turning the valve to produce the furnace-reversal. There is, therefore, in my device, no valve nor valve-seat in contact with the hot products of combustion to obstruct their flow and to become warped and leak, or to gather deposits of soot or hard carbon, causing leaks.

When any repair is required as the result, say, of accident to the mechanism of my improved device, the gas or air switching-duct is so adjusted as to become a part of the draft-system from the outgoing end of the furnace. If the repair is required on a gas-duct or on any part of its mechanism, that duct is disconnected from the respective flue terminal, thereby breaking the connection through the flue of that terminal to the stack, which has the same effect as introducing a damper into the flue; and the draft then all passes through the air-duct 33 to the stack, the furnace continuing in normal operation. Should the repair be required on the duct 33, it is disconnected from either terminal 16ᵃ or 17ᵃ, as the case may be, thereby causing the products of combustion from the furnace all to pass through the gas-flue to the stack. All parts of the mechanism being exposed and always cool and accessible, parts may be repaired or replaced at any time, and this without even requiring the gas to be shut off from the furnace, thereby reducing the cost of maintenance to the minimum and saving any loss or extravagant use of the gas, the flow of which, moreover, to the furnace, as also the draft to the stack, are rendered by my improvement free, being unobstructed by short turns, since the full openings through the flues are effective, thus materially increasing the draft on the furnace. Furthermore, the flue-construction not only prevents the possibility of any leak between flues from one to another, but the construction of the reversing mechanism renders it equally proof against leakage, from either gas or air passage to the stack, or between gas and air passages, however long the apparatus may have been in operation.

What I claim as new and desire to secure by Letters Patent is—

1. In combination, a furnace of the character described provided with a stack, a set of air and gas flues for each end of the furnace communicating through the furnace with the stack, the uptake flue-terminals presented adjacent to the furnace being separate structures insulated from each other and disconnected at their ends which project above the ground-level, and reversing mechanism for the furnace coöperating with the flues at said terminals, for the purpose set forth.

2. In combination, a furnace of the character described provided with a stack, a set of air and gas flues for each end of the furnace communicating through the furnace with the stack, the uptake flue-terminals presented adjacent to the furnace being separate underground structures with insulating filling material between them and disconnected at their ends which project above the ground-level, and reversing mechanism for the furnace coöperating with the flues at said terminals, for the purpose set forth.

3. In combination, a furnace of the character described provided with a stack, a set of air and gas flues for each end of the furnace communicating through the furnace with the stack and presenting terminals adjacent to the furnace, regulating-valves in the gas-flues and valveless reversing mechanism for the furnace coöperating with the flues at said terminals, for the purpose set forth.

4. In combination, a furnace of the character described provided with a stack, a set of air and gas flues for each end of the furnace communicating through the furnace with the stack and presenting terminals adjacent to the furnace, and valveless reversing mechanism for the furnace regulating valves in the gas-flues adjustably supported immediately on said terminals to coöperate thereat with the flues, for the purpose set forth.

5. In combination, a furnace of the character described provided with a stack, a set of air and gas flues for each end of the furnace communicating through the furnace with the stack and presenting terminals, regulating-valves in the gas-flues a flue leading to the stack and presenting terminals, gas-supply passages presenting terminals, and switching ducts, rotatably mounted at one end on said gas-flue terminals and on said stack-flue terminals and adapted to be swung thereon to register their free ends respectively with either air-flue terminal, either of said passage-terminals and the other stack-flue terminal, for the purpose set forth.

6. In a reversing apparatus of a regenerative furnace, the combination with a flue-terminal, of an annular water-trough thereon forming of its outer flange a circular track, a switching-duct provided on end with a ring carrying wheels riding on said track in rotating said duct, and with means coöperating with said trough to form a water-seal joint, and flue-terminals with which the opposite end of said duct is registrable by turning it on its support, for the purpose set forth.

7. In a reversing apparatus of a regenerative furnace, the combination with a flue-terminal, of an annular water-trough thereon forming of its outer flange a circular track, a switching-duct provided on one end with a ring carrying wheels riding on said track in rotating said duct, and with means coöperating with said trough to form a water-seal joint, flue-terminals with which the opposite end of said duct is registrable by turning it on its support, and means on said opposite end of the duct and on each of said flue-terminals coöperating to form a water-seal joint, for the purpose set forth.

8. In a reversing apparatus of a regenerative furnace, a switching-duct rotatably and tiltingly mounted at one end on one flue-terminal of the furnace to adapt it to be swung on said terminal to register its opposite end with either of adjacent flue-terminals, and to adapt said opposite end to be raised and lowered relative to a terminal with which it is caused so to register, for the purpose set forth.

9. In combination, a furnace of the character described provided with a stack, a set of air and gas flues for each end of the furnace communicating through the furnace with the stack and presenting terminals at a common point, a flue leading to the stack and presenting terminals at said common point, and switching-ducts rotatably mounted at one end on said gas-flue terminals and one of said stack-flue terminals, said ducts being interconnected to cause turning of one to simultaneously swing the free ends of all into registration, respectively, with either air-flue terminal, either of said passage-terminals and the other stack-flue terminal, for the purpose set forth.

10. In a reversing apparatus of a regenerative furnace, adjustable covers on the air flue terminals, a switching duct rotatably mounted at one end on the stack-flue terminal, adapted to register at its opposite end with either air-flue terminal, and a connection between said covers and duct for actuating the covers by the movements of the duct, for the purpose set forth.

11. In combination, a furnace of the character described provided with a stack, a set of air and gas flues for each end of the furnance communicating through the furnace with the stack and presenting terminals at a common point, a flue leading to the stack and presenting terminals at said common point, gas-supply passages presenting terminals at said point, switching-ducts rotatably mounted at one end on said gas-flue terminals and one of said stack-flue terminals and adapted to be turned thereon to swing their free ends into registration respectively with either air-flue terminal, either of said passage terminals and the other stack-flue terminal, covers hinged on the air-flue terminals, and means actuated by a duct in turning in one direction to raise one of said covers, for the purpose set forth.

12. In combination, a furnace of the character described provided with a stack, a set of air and gas flues for each end of the furnace communicating through the furnace with the stack and presenting terminals at a common point, a flue leading to the stack and presenting terminals at said common point, gas-supply pipes presenting terminals at said point, switching-ducts rotatably mounted at one end on said gas-flue terminals and one of said stack-flue terminals and adapted to be turned thereon to swing their free ends into registration respectively with either air-flue terminal, either of said passage-terminals and the other stack-flue terminal, covers hinged on the air-flue terminals, means for setting said covers, and means actuated by a duct in turning in one direction to raise one of said covers, for the purpose set forth.

13. In combination, a furnace of the character described provided with a stack, a set of air and gas flues for each end of the furnace communicating through the furnace with the stack and presenting terminals at a common point, a flue leading to the stack and presenting terminals at said common point, gas-supply passages presenting terminals at said point, switching-ducts rotatably mounted at one end on said gas-flue terminals and one of said stack-flue terminals and adapted to be turned thereon to swing their free ends into registration respectively with either air-flue terminal, either of said passage-terminals and the other stack-flue terminal, covers hinged on the air-flue terminals and provided with crank-arms, a rod connected between its ends with the pivotal end of the duct on said stack-flue terminal and working at its ends through said arms, and stops on the rod near its ends for engaging the crank-arms, for the purpose set forth.

THOMAS S. BLAIR, Jr.

In presence of—
N. B. DAVIES,
R. A. SCHAEFER.